Patented Aug. 6, 1940

2,210,777

UNITED STATES PATENT OFFICE 2,210,777

ARC WELDING ELECTRODE

Thomas J. Rasmussen and Joseph H. Humberstone, Schenectady, N. Y., assignors to General Electric Company, a corporation of New York No Drawing. Application December 28, 1938, Serial No. 248,102

4 Claims. (Cl. 219—8)

Our invention relates to an improved metallic arc welding electrode.

In metallic arc welding, an arc is maintained between the work to be welded and a rod, wire, or strip of metal, usually referred to as an electrode. During welding the electrode is fused or vaporized or both and the metal thereof deposited upon and welded to the work as the electrode is fed toward the work to maintain the arc.

The quality of the weld metal deposited by such a process depends to a large extent on the influence of certain elements or compounds associated with the electrode, usually in the form of a coating. Electrodes so coated are commonly referred to as flux coated electrodes.

When heavy coatings of flux are applied to electrodes, these coatings serve several purposes. One of the purposes of the coating is to form a desired slag for covering the molten weld metal. The coating also forms a shroud or crucible-like tip portion during welding which protects the electrode metal during its transfer from the electrode to the weld. Certain ingredients of the flux coating also produce an ambient gaseous shield which tends to exclude the oxygen and nitrogen of the air from contact with the weld as well as the metal being transferred from the electrode to the weld. In view of the results obtained with electrodes having heavy coatings of flux, they are frequently referred to as electrodes of the shielded arc type.

It is an object of our invention to provide improved fluxing materials which are particularly applicable as heavy coatings for electrodes of the shielded arc type.

It is a further object of our invention to provide a combination of ingredients in the flux coating material which improve the moisture resistance of the electrode coatings and also accelerates the drying of the electrode coatings.

Further objects of our invention will become apparent from the following description of our invention.

One flux in accordance with our invention has substantially the following composition:

| | Parts by weight |
|---|---|
| Alpha flock | 8 |
| $TiO_2$ | 4 |
| Asbestos | 4 |
| Ferro-manganese | 4 |
| Precipitated magnesium carbonate | 1 |
| Liquid sodium silicate (1:3.25 ratio) | 22 |

This flux when applied as a coating to a mild steel electrode is particularly suited for welding mild steel in any position to produce welds of a quality in excess of that required to meet the Rules for Construction of Unfired Pressure Vessels, Section VIII of the A. S. M. E. Boiler Construction code, paragraphs U–68 and U–69 of the 1937 edition. Ductility of the deposit is unusually good and resistance to corrosion is better than mild steel.

Electrodes coated with this flux have a fast melting rate and produce dense deposits without slag inclusions or gas pockets. Spatter loss is low, and the weld bead is smooth. When using such electrodes, a thin acid slag is produced. This slag is brittle and porous and has a glassy surface.

Electrodes coated with this flux should be used with direct current, reversed polarity; that is, with the electrode connected to the positive terminal of the source of supply.

When the above flux is modified by the addition of a particular amount of ferro-molybdenum, mild steel electrodes coated therewith are especially adapted for high tensile single- or multiple-pass arc welding in all positions on low carbon molybdenum steel or medium carbon (.30 to .35) steel where a minimum tensile strength of 65,000 pounds per square inch is required.

Flux compositions embodying the ferro-molybdenum constituent have in accordance with our invention substantially the following composition:

| | Parts by weight |
|---|---|
| Alpha flock | 8 |
| $TiO_2$ | 4 |
| Asbestos | 4 |
| Ferro-manganese | 4 |
| Ferro-molybdenum | 2 |
| Precipitated magnesium carbonate | 1 |
| Liquid sodium silicate (1:3.25 ratio) | 22 |

The chemical analysis of weld metal deposited with a mild steel electrode having a coating of this flux shows from .43 to .46 molybdenum on medium carbon steel and approximately .5 molybdenum on low carbon molybdenum steel. The physical characteristics of the deposited weld metal, as shown by actual tests on S–26 medium carbon steel (A. S. M. E.) ¾ inch plate, 60 degrees included angle, ¼ inch spacing, are given below.

| Physical characteristics of deposited weld metal | Vertical position, 5/32 in. electrode | | Flat position | |
|---|---|---|---|---|
| | | | 5/32 in. electrode | 3/16 in. electrode |
| | As welded | Stress relieved | As welded | As welded |
| Tensile strength (lb. per sq. in.) | 80,800 | 78,800 | 83,400 | 76,000 |
| Yield point (lb. per sq. in.) | 60,400 | 65,400 | 65,900 | 51,000 |
| Ductility (percent elongation in 2 in.) | 20.0 | 30.5 | 22.5 | 26.0 |
| Free Bend (percent elongation in outer fibers) | 33.0 | 54.0 | 41.0 | 30.0 |

The mild steel electrode material above referred to is preferably of the following composition:

| | |
|---|---|
| Carbon | .10 to .15 |
| Manganese | .45 to .65 |
| Phosphorus | .04 Max. |
| Sulphur | .05 Max. |

The alpha flock used in the above fluxes is a pulverant cellulose of the character disclosed in United States Letters Patent No. 2,054,301—George A. Richter, granted September 15, 1936. It is preferably of a fineness such that none will remain on a 100-mesh screen and a maximum of 25 per cent will pass through a 200-mesh screen. It is preferable to use this material in a condition in which it does not include more than 5 per cent moisture.

We also prefer to use in these fluxes an asbestos of the following composition:

| | |
|---|---|
| MgO | 34% minimum |
| Silica | 42% maximum |
| $Fe_2O_3$ | 6% maximum |
| FeO | 1–2% |
| $Al_2O_3$ | 3% maximum |
| CaO | 3% maximum |
| Ignition loss | 10–13% |

The ferro-manganese preferably used contains from 78 to 82 per cent manganese, 5.5 to 6.5 per cent carbon, 2.0 to 5.0 per cent silicon, and about .1 per cent phosphorus. The ferro-molybdenum preferably used contains about 60 per cent molybdenum.

The small amount of precipitated megnesium carbonate occurring in each of the above fluxes greatly improves the moisture resistance of electrode coatings formed thereof because of its reaction with the soluble sodium silicate used as a flux ingredient. By using precipitated magnesium carbonate in the manner disclosed, it is possible to obtain moisture resistance without subjecting the heavily coated electrode to excessive heat during the drying operation which in itself also tends to produce moisture resistance by more complete dehydration of sodium silicate. We believe that the effect of the precipitated magnesium carbonate is to form insoluble reaction products with the sodium silicate. These reaction products either in themselves produce an insoluble bond in the electrode or provide an insoluble film around particles of unreacted sodium silicate to render the entire bonding medium insoluble. By this we do not wish to infer that absolute insolubility is approached with the precipitated magnesium carbonate-sodium silicate ratios suggested, but rather that sufficient insolubility of the bonding medium is obtained to meet the moisture resistance requirements of the welding electrode industry. One standard that has been set up requires that electrodes as received from the manufacturer meet the requirements that after being humidified for 48 hours at 100 per cent relative humidity at 90° F., allowed to set for six hours at room temperature and then dried for two hours at 90° F. the electrodes so treated shall produce welds having the same characteristics and appearance as welds produced by the electrodes in their condition as received from the manufacturer.

Precipitated magnesium carbonate will produce increased moisture resistance with sodium silicates of any ratios and particularly with $Na_2O:SiO_2$ ratios varying from 1:2 to 1:4. It also accelerates the setting rate and consequently the drying rate of the electrode coating. In this connection, it has been found that the setting rate is controlled by the amount of precipitated magnesium carbonate used as well as by the alkalinity of the sodium silicate. The amount of precipitated magnesium carbonate required to produce a desired effect varies with the alkalinity of the liquid sodium silicate. The amount of precipitated magnesium carbonate given in the above flux formulas is, as noted above, with regard to a sodium silicate of a 1:3.25 ratio and a specific gravity of 42° Baumé. The effectiveness of the precipitated magnesium carbonate in controlling the drying rate of electrode coatings as well as in improving the moisture resistance of these coatings is determined by the amount used relative to the liquid sodium silicate in the flux. Beneficial results in moisture resistance and drying rate are obtained whenever precipitated magnesium carbonate is used with liquid sodium silicate. Considering the flux mixture as a total of 100 per cent when the liquid silicate is included, the precipitated magnesium carbonate is quite effective in producing the properties already mentioned if it is used so that it will be present in quantities up to 10 per cent of the liquid sodium silicate portion of the flux. For moisture resistance we prefer to use a sodium silicate of the 1:3.25 ratio where best results are obtained in approximately the ratio by weights recited in the above flux formulas. Apparently the fineness of the precipitated magnesium carbonate is a decided factor in its reaction with liquid sodium silicate. The precipitated magnesium carbonate that we have used will pass completely through a 325-mesh screen.

The above referred to fluxes are applied to the electrodes as a coating of sufficient thickness to produce electrodes of the shielded arc type; for example, a $\frac{1}{8}$ in. electrode having a coating as specified in the first formula above is provided with a flux coating having an outside diameter of .244 to .247 in. for vertical and overhead welding and with a coating of .255 to .258 in. outside diameter for welding in a flat or horizontal position. A $\frac{1}{8}$ in. electrode having a flux coating as specified in the second formula above given, is preferably provided with a coating having an outside diameter of from .255 to .258 in.

Reference has been made above to the use of precipitated magnesium carbonate for controlling the drying rate of fluxes containing liquid sodium silicate. An example of such use is given in the following flux formula:

| | |
|---|---|
| FeO | .7 |
| FeMn | 11 |
| Magnetite | 14 |
| $Na_2O$ | 7 |
| Silica | 9 |
| Mica | 7 |
| Flock | 3 |
| $MgCO_3$ (precipitated) | .5 |
| Silicate | 17.5 |

Without the precipitated magnesium carbonate ingredient, for a given temperature a longer drying time was required to produce a properly dried electrode. The amount of precipitated magnesium carbonate relative to the liquid sodium silicate on this flux is such as to render the flux useful in manufacturing production for a period of about four hours.

The solid ingredients in the flux compositions referred to above are used in a finely powdered condition. They are mixed with one another before adding the other ingredients to form a paste which is thereafter thoroughly mixed in order to produce a composition of uniform character. These flux compositions have the consistency required for applying coatings to electrodes by the extrusion process.

It is to be understood that the use of precipitated magnesium carbonate with fluxes containing liquid sodium silicate to produce moisture resisting coatings as well as for accelerating the drying rate of such coatings is not limited to the particular flux compositions above referred to. It is also to be understood that in the particular flux compositions above referred to, certain additions might be made without departing from the spirit and scope of our invention where the presence of these additions do not interfere with the interaction of the ingredients in the relative proportions recited. It is also to be understood that the flux need not of necessity be limited in its application to electrodes of the shielded arc type since coatings having thicknesses other than those above referred to by way of example may be used.

What we claim as new and desire to secure by Letters Patent of the United States is:

1. In the manufacture of arc welding electrodes having a coating of flux which as applied to the electrodes contains liquid sodium silicate as one of its principal ingredients, the method of improving the moisture resistance of said coatings which comprises adding to the flux precipitated magnesium carbonate.

2. An arc welding electrode having a moisture resisting coating containing the reaction products of liquid sodium silicate and precipitated magnesium carbonate.

3. An arc welding electrode of mild steel having a flux coating which as applied to the electrode has substantially the following composition:

| | Parts by weight |
|---|---|
| Alpha flock | 8 |
| TiO$_2$ | 4 |
| Asbestos | 4 |
| Ferro-manganese | 4 |
| Ferro-molybdenum | 2 |
| Precipitated magnesium carbonate | 1 |
| Liquid sodium silicate (1:3.25 ratio) | 22 |

4. An arc welding electrode of mild steel having a flux coating which as applied to the electrode has substantially the following composition:

| | Parts by weight |
|---|---|
| Alpha flock | 8 |
| TiO$_2$ | 4 |
| Asbestos | 4 |
| Ferro-manganese | 4 |
| Precipitated magnesium carbonate | 1 |
| Liquid sodium silicate (1:3.25 ratio) | 22 |

THOMAS J. RASMUSSEN.
JOSEPH H. HUMBERSTONE.